United States Patent Office 3,488,348
Patented Jan. 6, 1970

3,488,348
5-NITRO-FURFURYLIDENE-(2)-IMINO DERIVATIVES AND THEIR PREPARATION
Karl-Heinrich Mayer, Leverkusen, Heinz Herlinger, Cologne-Flittard, Siegfried Petersen, Leverkusen, and Axel Haberkorn and Marianne Bock, Wuppertal-Elberfeld, Germany, assignors to Farbenfabriken Bayer Aktiengesellschaft, Leverkusen, Germany, a corporation of Germany
No Drawing. Filed Dec. 23, 1966, Ser. No. 604,172
Claims priority, application Germany, Jan. 5, 1966,
F 48,092
Int. Cl. C09b 55/00; C07d 93/10
U.S. Cl. 260—240
9 Claims

ABSTRACT OF THE DISCLOSURE 5-nitro-furfurylidene - (2)-imino derivatives prepared from 5-nitrofurfurol - (2) and 4-amino-tetrahydro-1,4-thiazine - 1,1-dioxides are provided which have broad activity against parasitic Trypanosomes, particularly those occurring in cattle and horses viz. *T. equiperdum* and *T. equinum*. Exemplary compounds are 4-(5'-nitro-furfurylidene-imino) - 3-mehoxymethyl-tetrahydro - 1,4-thiazine - 1,1-dioxide and 4-[5-'nitrofurfurylidene - (2')-imino] - 3-butylsulphonylmethyl-tetrahydro - 1,4-thiazine-1,1-dioxide.

---

The preparation of 4-(5'-nitro-furfurylidene-imino)-tetrahydro - 1,4-thiazine - 1,1-dioxide derivatives by the reaction of 5-nitrofurfurol - (2) with 4-amino-tetrahydro-1,4-thiazine - 1,1-dioxides is known and has been described in German Patent No. 1,170,957.

It has now been found in accordance with the present invention that chemotherapeutically valuable, new derivatives of this class of compounds are obtained when 5-nitrofurfurol - (2)- or its reactive derivatives are reacted with 4-amino-tetrahydro - 1,4-thiazine - 1,1-dioxides which are substituted by one or two groups R—X—CH$_2$ wherein X is —O—, —S— or —SO$_2$— and R is an alkyl, alkenyl, alkinyl, cycloalkyl, aralkyl or aryl group which may also be substituted by alkoxy or dialkylamino radicals.

The new compounds have the formula:

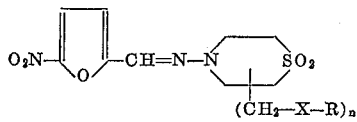

in which X and R have the same meaning as above and $n$ is 1 or 2. In particular, R can, for example, represent a methyl, ethyl, propyl, isopropyl, butyl, allyl, propargyl, cyclohexyl, benzyl, phenyl, methoxyethyl or dimethylamino-ethyl group.

The new 4-amino-tetrahydro - 1,4-thiazine - 1,1-dioxides required as starting materials for the synthesis can be prepared as follows:

1,2-epoxy-propanes substituted in the 3-position according to the formula R—X—CH$_2$— are reacted with mercaptoethanol or hydrogen sulphide to give thioethers, these are oxidized to sulphones and subsequently ring-closed to form thioxane dioxides in which the ring oxygen atom can be exchanged in known manner for the >N—NH$_2$ group.

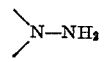

The reaction of the 4-amino-tetrahydro-1,4-thiazine-1,1-dioxides with 5-nitrofurfurol - (2) or its reactive derivatives, such as the diacetate or oxime, expediently takes place in solvents or solvent mixtures in which the starting components are soluble and the end products are insoluble.

The new 5-nitro-furfurylidene - (2)-imino derivatives are characterized by a high activity against numerous types of Trypanosomes parasitizing the human and animal organism, while having a low toxicity.

Whereas the emphasis of the direction of activity of the compounds described in German Patent No. 1,170,957 is particularly against *Trypanosoma (T.) cruzi*, the cause of chagas disease in man, and *T. congolense*, the new derivatives according to the invention, while also having a very good action against *T. cruzi, T. congolense* and other Trypanosome strains, show an especially good action against *T. vivax*, the cattle Trypanosome which is very widespread in Africa, and, in particular, against *T. equiperdum* and *T. equinum* occurring in horses.

A comparison of the therapeutic indices, which have been determined in the various Trypanosome strains, shows the advance which is achieved with the compounds according to the invention, compared with the compounds known from German Patent No. 1,170,957.

The products of the invention were tested on NMRI mice with an average weight of 18 to 22 g. which had been infected with the Trypanosome strains concerned. The treatment commenced one day after infection. Mice infected with *T. cruzi* were treated four times, at intervals of 24 hours, with the doses stated in the table. In the case of all other mentioned Trypanosome infections, only one treatment took place. Two to four animals were used per dose. For evaluation, blood samples of the treated animals were microscopically investigated for Trypanosomes, in comparison with untreated infected control animals.

In the following table, the average activity of a compound according to the invention is compared with that of a compound from German Patent No. 1,170,957.

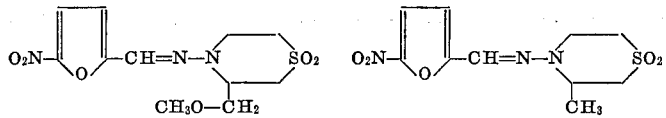

| Test with Trypanosoma— | Most important natural host | Treatment | | Findings, mg./kg. | | | | | | Therap. Index | |
|---|---|---|---|---|---|---|---|---|---|---|---|
| | | Number | Mode | 1,000 | 500 | 250 | 100 | 50 | 25 | | |
| cruzi | man | 4 | subc. | dead | W | W | W | Sp | φ | 1:10 | 1:100 |
| | | | p.o. | W | W | W | W | Sp | φ | 1:20 | 1:100 |
| gambiense | man | 1 | subc. | W | W | W | W | Sp-φ | φ | 1:20 | 1:4 |
| | | | p.o. | H | H | H-W | W | φ | | 1:10 | 1:10 |
| rhodesiense | man | 1 | subc. | H | H | H | W | φ | | 1:10 | 1:4 |
| | | | p.o. | W | W | W | W-H | W-Sp | φ | 1:20 | 1:10 |
| brucei | horse and cattle | 1 | subc. | H | H | H | W | φ | | 1:10 | 1:20 |
| | | | p.o. | H | H | H-W | Sp-φ | | | 1:10 | 1:2 |
| congolense | cattle | 1 | subc. | W-H | H-W | φ | | | | 1:2 | 1:25 |
| | | | p.o. | H | W | W | φ | | | 1:4 | 1:20 |
| vivax | do | 1 | subc. | H | H-W | W | Sp-φ | φ | | 1:10 | 1:2 |
| | | | p.o. | H | H | W | φ | | | 1:4 | 1:2 |
| evansi | do | 1 | subc. | W | W | W | W-Sp | φ | | 1:10 | 1:4 |
| | | | p.o. | H | H | H | W | Sp | φ | 1:20 | 1:10 |
| equinum | do | 1 | subc. | W | W | W | φ | | | 1:4 | 1:4 |
| | | | p.o. | W | W | W | φ | | | 1:4 | 1:2 |
| equiperdum | do | 1 | subc. | W | W | W | W-Sp | φ | | 1:10 | 1:1 |
| | | | p.o. | H | W | Sp | W-Sp | | | 1:10 | 1:2 |

Explanation of symbols:
H=effect, healing;
W=*Trypanosomes* disappear from the blood for less than 21 days;
Sp=trace of effect, *Trypanosomes* continuously detectable but in smaller number than in the untreated controls, period of life lengthened;
φ=no effect.

The therapeutic index indicates the ratio of maximum tolerated dose to minimum effective dose.

The invention is illustrated by the following nonlimitative examples:

EXAMPLE 1

4-(5'-nitro-furfurylidene-imino)-3-methoxymethyl-tetrahydro-1,4-thiazine-1,1-dioxide 23 g. of 3-methoxymethyl-4-amino-tetrahydro-1,4-thiazine-1,1-dioxide hydrochloride are dissolved hot in 75 ml. of methanol and 25 ml. of water and mixed with a solution of 14.1 g. of 5-nitrofurfurol-(2) in 25 ml. of methanol. An exothermal reaction thereby takes place and the hydrazone crystallizes out. After filtering off with suction and washing with methanol, an analytically pure product is immediately obtained.

Yield 27 g. (85% of theory), yellow crystals, M.P. 120 to 123° C.

*Analysis.*—Calculated for $C_{11}H_{15}N_3O_6S$ (317.2): C, 41.64%; H, 4.77%; N, 13.25%. Found: C, 41.72%; H, 4.87%; N, 13.43%.

The 3-methoxymethyl-4-amino-tetrahydro-1,4-thiazine-1,1-dioxide hydrochloride (M.P. 233° C. with decomp. after recrystallization from water) was obtained by reacting 3-methoxymethyl-1,4-thioxane-1,1-dioxide with hydrazine hydrate.

The 3-methoxymethyl-1,4-thioxane-1,1-dioxide (M.P. 66 to 68° C. after recrystallization from alcohol) can be obtained by oxidation of 2-hydroxyethyl-2'-hydroxy-3'-methoxy-propyl sulphide with hydrogen peroxide and subsequent ring closure in a dilute aqueous sodium hydroxide solution.

*Analysis.*—Calculated for $C_6H_{12}SO_4$ (180.16): C, 40.00%; H, 6.71%; O, 35.53%. Found: C, 40.32%; H, 6.77%; O, 35.68%.

The 2-hydroxyethyl-2'-hydroxy-3'-methoxy-propyl sulphide (B.P. 131 to 135° C./1.4 mm. Hg) is prepared by the reaction of mercaptoethanol with 1,2-epoxy-3-methoxy-propane.

EXAMPLE 2

4-(5'-nitro-furfurylidene-imino)-3-ethoxymethyl-tetrahydro-1,4-thiazine-1,1-dioxide 24.5 g. of 3-ethoxymethyl-4-amino-tetrahydro-1,4-thiazine-1,1-dioxide hydrochloride are dissolved hot in 75 ml. of methanol and mixed with a solution of 14.1 g. of 5-nitrofurfurol-(2) in 25 ml. of methanol. The reaction mixture is heated to boiling for 5 minutes, cooled, the precipitated hydrazone is isolated by suction filtration and recrystallized from methanol. There are obtained 27 g. (80% of theory) of yellow crystals of M.P. 143 to 144° C.

The 3-ethoxymethyl-4-amino-tetrahydro-1,4-thiazine-1,1-dioxide hydrochloride (M.P. 191 to 192° C. after recrystallization from methanol) was obtained by the reaction of 3-ethoxymethyl-1,4-thioxane-1,1-dioxide with hydrazine hydrate.

The 3-ethoxymethyl-1,4-thioxane-1,1-dioxide (M.P. 53 to 55° C. after recrystallization from alcohol) can be obtained by the oxidation of 2-hydroxyethyl-2'-hydroxy-3'-ethoxy-propyl sulphide with hydrogen peroxide and subsequent ring closure in a dilute aqueous sodium hydroxide solution.

The 2-hydroxyethyl-2'-hydroxy-3'-ethoxy-propyl sulphide (B.P. 120 to 125° C./1.5 mm. Hg) is prepared by the reaction of mercaptoethanol with 1,2-epoxy-3-ethoxy-propane.

EXAMPLE 3

4-(5'-nitro-furfurylidene-imino)-3-phenoxymethyl-tetrahydro-1,4-thiazine-1,1-dioxide 17.9 g. of 3-phenoxymethyl-4-amino-tetrahydro-1,4-thiazine-1,1-dioxide in 75 ml. of methanol are mixed with a few drops of concentrated hydrochloric acid and combined with a solution of 10 g. of 5-nitrofurfurol-(2) in 75 ml. of methanol. Spontaneous crystallization occurs. The yield of the crude product amounts to 96 to 98% of theory. M.P. 175 to 177° C. after recrystallization from dimethyl formamide/methanol.

*Analysis.*—Calculated for $C_{16}H_{17}N_3O_6S$ (379.4): C, 50.70%; H, 4.52%; N, 11.08%; S, 8.32%. Found: C, 50.65%; H, 4.50%; N, 11.18%; S, 8.00%.

The 3-phenoxymethyl-4-amino-tetrahydro-1,4-thiazine-1,1-dioxide used as starting material was obtained by the reaction of 3-phenoxymethyl-1,4-thioxane-1,1-dioxide with hydrazine hydrate. M.P. 183 to 185° C. after recrystallization from glycol monomethyl ether.

*Analysis.*—Calculated for $C_{11}H_{16}N_2O_3S$ (256.3): C, 51.50%; H, 6.23%; N, 10.50%; S, 12.50%. Found: C, 51.46%; H, 6.32%; N, 10.89%; S. 12.35%.

The 3-phenoxymethyl-1,4-thioxane-1,1-dioxide is obtained by the reaction of mercapto-ethanol with phenoxy-propylene oxide, subsequent oxidation with hydrogen peroxide and ring closure in a dilute acqueous sodium hydroxide solution. M.P. 105 to 107° C. after recrystallization from alcohol.

*Analysis.*—Calculated for $C_{11}H_{14}O_4S$ (242.3): C 54.50%; H, 5.77%; S, 13.2%. Found: C, 54.55%; H, 6.13%; S, 13.2%.

EXAMPLE 4

4-[5'-nitrofurfurylidene-(2')-imino]-3-allyloxymethyl-tetrahydro-1,4-thiazine-1,1-dioxide 22 g. of 3-allyloxymethyl-4-amino-tetrahydro-1,4-thiazine-1,1-dioxide and 14.1 g. of 5-nitrofurfurol-(2) are heated to boiling temperature in 100 ml. of methanol and 0.5 ml. of glacial acetic acid. An orange-colored product crystallizes from the clear red solution upon cooling. Yield 26 g., M.P. 120–122° C. after recrystallization from methanol.

Starting materials:

The 3 - allyloxymethyl - 4 - amino-tetrahydro-1,4-thiazine-1,1-dioxide (undistillable oil) is prepared from 3-allyloxymethyl-1,4-thioxane-1,1-dioxide and hydrazine hydrate.

The 3-allyloxymethyl-1,4-thioxane-1,1-dioxide (B.P. 165–170° C./0.2 mm. Hg) is prepared from 2-hydroxyethyl-2'-hydroxy-3'-allyloxy-propyl sulphide by oxidation with hydrogen peroxide and ring closure in a dilute aqueous sodium hydroxide solution.

The 2 - hydroxyethyl-2'-hydroxy-3'-allyloxy-propyl sulphide (B.P. 150° C./0.3 mm. Hg) is prepared from hydroxyethyl-mercaptan and 1,2-epoxy-3-allyloxy-propane.

EXAMPLE 5

4-[5'-nitrofurfurylidene-(2')-imino]-3-(2'-methoxyethoxy-methyl)-tetrahydro-1,4-thiazine-1,1-dioxide 47.6 g. of 3-(2-methoxy-ethoxymethyl)-4-amino-tetrahydro-1,4-thiazine-1,1-dioxide and 28.2 g. of 5-nitrofurfurol-(2) are dissolved in 200 ml. of methanol and 5 ml. of glacial acetic acid and the solution is heated at boiling temperature for 5 minutes. Upon cooling, yellow crystals are precipitated; these are filtered off with suction and recrystallized from about 700 ml. of methanol. Yield 52 g., M.P. 98–101° C.

Starting materials:

The 3 - (2' - methoxy - ethoxymethyl)4-amino-tetrahydro-1,4-thiazine-1,1-dioxide (M.P. 80–82° C.) is prepared from 3-(2'-methoxy-ethoxymethyl)-1,4-thioxane-1,1-dioxide and hydrazine hydrate.

The 3 - (2' - methoxy - ethoxymethyl)-1,4-thioxane-1,1-dioxide (B.P. 158° C./0.1 mm. Hg) is prepared from 2 - hydroxyethyl - 2' - hydroxy-3'-(2-methoxy-ethoxy)-propyl sulphide by oxidation with hydrogen peroxide and ring closure in a dilute aqueous sodium hydroxide solution.

The 2 - hydroxyethyl - 2' - hydroxy-3'-(2-methoxy-ethoxy)-propyl sulphide (B.P. 164–167° C./0.08 mm. Hg) is prepared from hydroxyethyl mercaptan and 1,2-epoxy-3-(2'-methoxy-ethoxy)-propane.

The 1,2-epoxy-3-(2'-methoxy-ethoxy)-propane (B.P. 80–81° C./14 mm. Hg) is prepared from epichlorohydrin and glycol monomethyl ether and by ring closure in a dilute aqueous sodium hydroxide solution.

EXAMPLE 6

4-[5'-nitrofurfurylidene-(2')-imino]-3-butoxymethyl-tetrahydro-1,4-thiazine-1,1-dioxide 23.6 g. of 3 - butoxymethyl-4-amino-tetrahydro-1,4-thiazine-1,1-dioxide and 14.1 g. of 5-nitrofurfurol-(2)- are heated to boiling temperature in 100 ml. of methanol and 0.5 ml. of glacial acetic acid. A yellow-red product crystallizes out upon cooling. The melting point is 103–105° C. after recrystallization from methanol; the yield amounts to 30 g.

Starting materials:

The 3 - butoxymethyl - 4 - amino-tetrahydro-1,4-thiazine-1,1-dioxide (M.P. 58–60° C.) is prepared from 3-butoxymethyl-1,4-thioxane-1,1-dioxide and hydrazine hydrate.

The 3-butoxymethyl-1,4-thioxane-1,1-dioxide (B.P. 150–155° C./0.05 mm. Hg) is prepared from 2-hydroxyethyl-2'-hydroxy13'-butoxy-propyl sulphide by oxidation with hydrogen peroxide and ring closure in a dilute aqueous sodium hydroxide solution.

The 2-hydroxyethyl-2'-hydroxy-3'-butoxy-propyl sulphide (B.P. 145° C./0.15 mm. Hg) is prepared from mercapto-ethanol and 1,2-epoxy-3-butoxy-propane.

EXAMPLE 7

4-[5'-nitrofurfurylidene-(2')-imino]-3-butylsulphonyl-methyl-tetrahydro-1,4-thiazine-1,1-dioxide 14.2 g. of 3-butylsulphonylmethyl-4-aminotetrahydro-1,4-thiazine-1,1-dioxide are dissolved hot in 35 ml. of water and mixed with a solution of 5 g. of 5-nitrofurfurol-(2) in 15 ml. of methanol. Three drops of concentrated hydrochloric acid are added and the mixture is heated at boiling temperature for 5 minutes. Upon cooling, a red oil separates which becomes crystalline when boiled with water. After recrystallization from methanol, 16.5 g. of yellow-red crystals of M.P. 165–167° C. are obtained.

Analysis.—Calculated for $C_{14}H_{21}N_3O_7S_2$ (407.45): C, 41.27%; H, 5.19%; S, 15.75%. Found: C, 41.35%; H, 5.12%; S, 15.80%.

Starting materials:

The 3 - butylsulphonylmethyl-4-amino-tetrahydro-1,4-thiazine-1,1-dioxide (M.P. 118–120° C.) is prepared from 3-butylsulphonylmethyl-1,4-thioxane-1,1-dioxide and hydrazine hydrate.

The 3 - butylsulphonylmethyl-1,4-thioxane-1,1-dioxide (M.P. 111–114° C.) is prepared from 2-hydroxyethyl-2'-hydroxy-3'-butylmercapto-propyl sulphide by oxidation with hydrogen peroxide and ring closure in a dilute aqueous sodium hydroxide solution.

The 2 - hydroxyl-2'-hydroxy-3'-butylmercapto-propyl sulphide (B.P. 152° C./0.15 mm. Hg) is prepared from hydroxyethylmercaptan and 1,2-epoxy-3-butylmercapto-propane.

EXAMPLE 8

4-[5'-nitrofurfurylidene-(2')-imino]-3,5-bismethoxymethyl-tetrahydro-1,4-thiazine-1,1-dioxide 59.5 g. of 3,5-bismethoxymethyl-4-amino-tetrahydro-1,4-thiazine-1,1-dioxide are dissolved hot in 300 ml. of methanol and 25 ml. of concentrated hydrochloric acid, 35.3 g. of 5-nitrofurfurol-(2) are added and the mixture is heated to boiling temperature. A yellow product crystallizes out, which is filtered off with suction when cold and washed with water and methanol. After recrystallization from a mixture of dimethyl formamide and water, the melting point is 174–176° C.

Analysis.—Calculated for $C_{13}H_{19}N_3O_7S$ (361.38): C, 43.20%; H, 5.30%; N, 11.63%; O, 31.06%; S, 8.87%. Found C, 43.49%; H, 5.24%; N, 10.77%; O, 31.08%; S, 8.91%.

Starting materials:

The 3,5-bismethoxymethyl - 4 - amino-tetrahydro-1,4-thiazine-1,1-dioxide (viscous undistillable oil) is prepared from 3,5-bismethoxymethyl-1,4-thioxane-1,1-dioxide and hydrazine hydrate.

The 3,5-bismethoxymethyl - 1,4 - thioxane-1,1-dioxide (B.P. 140–145° C./0.1 mm. Hg) is prepared from 2,2'-bishydroxy-3,3'-bismethoxy-propyl sulphide by oxidation with hydrogen peroxide and ring closure in a dilute aqueous sodium hydroxide solution.

The 2,2'-bishydroxy-3,3'-bismethoxy-propyl sulphide (B.P. 140–145° C./0.1 mm. Hg) is prepared from 1,2-epoxy-3-methoxy-propane and 2-hydroxy - 3 - methoxy-propane and 2-hydroxy-3-methoxy-propyl-mercaptan.

The 2-hydroxy-3-methoxy-propyl-mercaptan (B.P. 88–90° C./14 mm. Hg) is prepared from 1,2-epoxy-3-methoxy-propane and thioacetic acid and by hydrolysis with methanolic hydrochloric acid.

What is claimed is:
1. A compound of the formula:

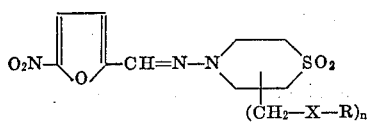

in which
X is —O—, —S— or —SO$_2$—,
R is lower alkyl, allyl, propargyl, cyclohexyl, benzyl or phenyl unsubstituted or lower alkoxy- or di-methyl-amino-ethyl substituted and
n is 1 or 2.

2. The compound of claim 1 which is 4-(5'-nitrofurfurylidene-imino) - 3 - methoxymethyl-tetrahydro - 1,4-thiazine-1,1-dioxide.

3. The compound of claim 1 which is 4-(5'-nitrofurfurylidene-imino) - 3 - ethoxymethyl-tetrahydro - 1,4-thiazine-1,1-dioxide.

4. The compound of claim 1 which is 4-(5'-nitrofurfurylidene-imino - 3 - phenoxymethyl-tetrahydro - 1,4-thiazine-1,1-dioxide.

5. The compound of claim 1 which is 4-[5'-nitrofurfurylidene - (2)' - imino - 3 - allyloxymethyl-tetrahydro-1,4-thiazine-1,1-dioxide.

6. The compound of claim 1 which is 4-[5'-nitrofurfurylidene-(2')-imino] - 3 - (2'-methoxy-ethoxy-methyl)-tetrahydro-1,4-thiazine-1,1-dioxide.

7. The compound of claim 1 which is 4-[5'-nitrofurfurylidene-(2')-imino] - 3 - butoxymethyl-tetrahydro-1,4-thiazine-1,1-dioxide.

8. The compound of claim 1 which is 4-[5'-nitrofurfurylidene-(2')-imino] - 3 - butylsulphonylmethyl-tetrahydro-1,4-thiazine-1,1-dioxide.

9. The compound of claim 1 which is 4-[5'nitrofurfurylidene - (2')-imino]-3,5-bismethoxymethyl-tetrahydro-1,4-thiazine-1,1-dioxide.

References Cited

UNITED STATES PATENTS 3,262,930  7/1966  Herlinger et al. _____ 260—240

FOREIGN PATENTS 3,257  4/1965  France.

OTHER REFERENCES

Karrer: Organic Chemistry, 4th English ed., p. 928, Elsevier Pub. Co., New York, 1950.

JOHN D. RANDOLPH, Primary Examiner

U.S. Cl. X.R.

260—243; 424—246